United States Patent Office 3,410,696
Patented Nov. 12, 1968

3,410,696
PROCESS FOR LENGTHENING THE POST-HARVEST LIFE OF CERTAIN PERISHABLE FRUITS AND VEGETABLES
Daniel Rosenfield, Yonkers, N.Y., assignor to Union Carbide Corporation, a corporation of New York
No Drawing. Filed Aug. 19, 1964, Ser. No. 390,731
7 Claims. (Cl. 99—168)

ABSTRACT OF THE DISCLOSURE

Prolonging the postharvest life of fruits and vegetables by coating the surface with a flexible polymeric vinyl acetate coating which contains at least 50% by weight of vinyl acetate.

---

This invention relates to a novel process for lengthening the postharvest life of certain perishable fruits and vegetables. In one aspect, this invention relates to a novel process for the treatment of certain perishable fruits and vegetables wherein the postharvest physiological processes of maturation and senescence are reduced to a minimal rate without deleterious biochemical or organoleptic changes.

The problem of maintaining the quality of food products by preventing spoilage engendered either externally, i.e., microbiologically, or internally, i.e., autolytically has long been of concern in the art. This problem has been particularly significant in connection with whole fruits and vegetables in postharvest form. While a few food products such as potatoes, apples, lemons and the like have a relatively long postharvest life, in some instances several months, the majority of fruits and vegetables, after harvest, have a life which is limited to a few days or at most a few weeks under ideal conditions. This, of course, results in wide fluctuations in the availability of the product to the ultimate consumer, and hence controls the price one must pay for such products. Immediately after harvest the supply is at its greatest and prices are at a minimum regardless of day to day variances. However, during the winter months when many food products are either unavailable or must be obtained from distant sources, the cost to the consumer is considerably higher. Hence, any method which maintains the postharvest quality of food products, particularly fruits and vegetables, beyond this normal marketing period is particularly desirable both to the supplier and consumer.

Heretofore, a variety of methods have been known and employed with varying degrees of success for lengthening the postharvest life of food products. Undoubtedly, one of the earliest means for lengthening the postharvest life of fruits and vegetables was temperature control, i.e., refrigeration. However, most fruits and vegetables cannot be stored for prolonged periods at reduced temperatures without adverse effects on the taste, odor or quality of the product. For instance, green bananas and green tomatoes cannot be stored below 50° F. without encountering chilling injury, i.e., tissue damage. Hence, in many instances refrigeration is not particularly desirable or effective in achieving a satisfactory reduction in the postharvest physiological processes.

Various other methods have also been proposed for extending the postharvest life of food products. For instance, the literature is replete with numerous processes for coating food products for appearance, protection or improvement of keeping quality during the normal marketing period. However, none of these methods has been entirely successful or has met with significant commercial success. For example, U.S. Patent No. 2,213,557 discloses a method for coating fruits and vegetables with an aqueous emulsion of a water-insoluble emulsion polymer resin. However, this process, as disclosed, appears to be concerned primarily with imparting an improved appearance to the produce as well as reducing desiccation during the normal marketing period. There is no indication that any reduction occurs in the physiological processes which is necessary to extend the postharvest life.

It is a well known technical fact that significant prolongation of the postharvest life of food products can not be obtained without a reduction in metabolic activity. Moreover, the factor by which the physiological processes are slowed down is approximately equivalent to the factor by which the postharvest life is extended.

It has been noted that the rate of postharvest ripening and aging can be equated to the respiration rate which is expressed in cubic centimeters of oxygen consumed or carbon dioxide evolved per kilogram of food product per hour. The overall respiration reaction may be expressed by the following equation wherein glucose reacts with oxygen to give carbon dioxide and water:

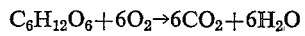

$$C_6H_{12}O_6 + 6O_2 \rightarrow 6CO_2 + 6H_2O$$

It is understood that the above reaction represents a host of complex reactions responsible for postharvest ripening and aging.

It has also been observed that the optimum extension of the postharvest life of food products is critically dependent upon three factors: (a) reduction in desiccation, (b) reduction in the physiological processes of maturation and senescene, and (c) reduction in the onset and rate of microbial growth. Unless all three factors are carefully controlled, optimum extension of postharvest life is not achieved.

Prior to the instant invention, the coating of produce with films having a low vapor transmission was useful for retarding desiccation and improving the appearance during the normal postharvest marketing period, i.e., a few days or weeks. However, the prior art coatings which have low vapor transmissions are also characterized by oxygen and carbon dioxide permeabilities which are inadequate to retard the physiological processes. Hence, while the prior art methods have largely been concerned with protective coatings to prevent bruising or excessive desiccation, or coatings which impart an improved appearance without the need for buffing or polishing, no satisfactory coatings have been proposed which possess the combined features of adequate desiccation, respiration and fungal control. Moreover, due to cumbersome methods of application and other undesirable features, most of these materials have met with little commercial acceptance.

Accordingly, one or more of the following objects will be achieved by the practice of the instant invention. It is an object of this invention to provide a novel process for the treatment of certain fruits and vegetables wherein the postharvest physiological processes of maturation and senescence are reduced to a minimal rate without deleterious biochemical or organoleptic changes. A further object of this invention is to provide a novel process for the treatment of certain perishable fruits and vegetables wherein there is obtained a simultaneous reduction in desiccation, reduction in the onset and rate of microbiological growth, and control of respiration without adversely affecting the quality of the produce. Another object of this invention is to provide a novel process for extending the postharvest life of certain fruits and vegetables beyond their normal marketing period. A further object of this invention is to provide a novel process for the treatment of certain fruits and vegetables with a coating composition which provides the combined features of adequate desiccation, respiration and fungal control necessary for extending the postharvest life beyond the normal marketing period. Another object of this invention is to provide a novel process for the treatment of certain fruits and vegetables with a coating composition which is odorless and easily applied to the produce. These and other objects will readily become apparent to those skilled in the art in the light of the teachings herein set forth.

In its broad aspect, the present invention is directed to a novel process for lengthening the postharvest life of certain perishable fruits and vegetables as hereinafter indicated. In most instances, the postharvest life can be extended for periods considerably greater than the normal marketing periods, in some instances, for as long as an entire season. It should also be noted that the process of the instant invention is particularly useful for treating fruits and vegetables not merely to enhance their appearance or keeping quality during the normal postharvest marketing period, but for conditioning the produce which can then be safely stored for periods as long as several months. By the present invention, it is possible to treat produce, for example, cantaloupes, immediately after harvesting when the supply is abundant, and store them well beyond the normal marketing period, in many instances until the winter season.

The process of the present invention comprises coating the comestible, i.e., the fruit or vegetable, with an organic latex, which upon drying forms a continuous, flexible coating over the entire surface of the comestible, the coating being characterized by a thickness such that: (1) the weight of the coating is from about 5 to about 15 grams per 1000 grams of uncoated comestible; (2) the weight loss of the coated comestible after 24 days at 34° F. is less than about 5 percent; and (3) the oxygen respiration rate at 70° F. is reduced from about 75 to about 85 percent of the oxygen respiration rate of the uncoated comestible, or the oxygen respiration rate at 34° F. is reduced from about 45 to about 55 percent of that of the uncoated comestible.

As previously indicated, in order to significantly prolong the postharvest life of fruits and vegetables, e.g., cantaloupes, desiccation must be minimized, the postharvest physiological processes of maturation and senescence must be retarded, and the growth of surface microbes needs to be delayed or prevented. In order to obtain the maximum period, all three of these factors must be achieved in the most optimum manner. Additionally, in order to achieve any of these objectives it is mandatory that the coating form a continuous and flexible film over the surface of the product.

One of the primary characteristics required of a coating which is employed to extend the postharvest life of fruits and vegetables is its ability to retard desiccation. Although coating compositions are known which are effective in preventing excessive desiccation, for the most part, they suffer from one or more disadvantages. For instance, most of the known compositions heretofore employed are relatively good barriers against the transmission of moisture vapor. Hence, they need only be applied to the food product as relatively thin films in order to achieve the desired reduction in moisture transmission. However, when so employed, these coatings are not of a sufficient thickness to form a continuous film over the entire surface of the produce. In fruits such as cantaloupes which are characterized by a warty rind, the application of a thin coating usually results in many voids or openings which provide sites for microbial growth, inadequate control of desiccation and other undesirable features.

It should be noted that these materials are also good barriers to oxygen and carbon dioxide as well as water and therefore from a biological standpoint, one cannot simply increase the thickness of the coating for then the film would become almost a complete barrier to oxygen and carbon dioxide as well as moisture. Oxygen within the produce would drop to zero and the carbon dioxide level would rise to very high levels causing the produce to undergo deleterious changes in flavor, color, and texture. The first would be most markedly affected as there would be no oxygen to support respiration and fermentative reactions would take place as represented by the following equation:

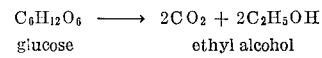

$$\underset{\text{glucose}}{C_6H_{12}O_6} \longrightarrow 2CO_2 + \underset{\text{ethyl alcohol}}{2C_2H_5OH}$$

From the principles of film permeability to gases and vapors, it could be expected that most any film would offer a barrier to the passage of water vapor molecules. However, in the case of coatings which are in intimate contact with the produce surface, the situation is more involved than simply barring the passage of moisture. In this case, a steady-state moisture vapor equilibrium is attained at the interface of the film coating and the produce surface. This is primarily dependent upon the moisture vapor barrier properties of the film. The greater the barrier properties, the higher the moisture equilibrium (humidity) at the interface. Assuming constant ambient temperature and humidity, there will be a relatively constant passage of water vapor molecules from the interface through the film to the atmosphere. This is because the ambient humidity is usually lower than that at the interface. As this happens the produce gives up some water vapor to bring the interface back to its equilibrium state. Thus, the produce loses water at the same rate the water passes through the film coating which is, of course, dependent upon the vapor barrier properties of the film coating.

A discussion of each of the three requisites necessary to attain optimum postharvest life will facilitate the understanding of the present invention. In practice, it has been found that the first requisite, i.e., retardation of desiccation, can be achieved by the process of this invention when the produce has a coating of from about 4 to about 10 mils in thickness. Within this range, desiccation after harvest is reduced to a minimal rate without deleterious biochemical or organoleptic changes. Coating thickness above and below the aforesaid range, if employed, will not provide the desired objectives.

In many instances, due to the surface structure and nature of the product being coated, such as for example, cantaloupes, it is extremely difficult to accurately measure the thickness of the coating by standard means. However, the ratio of the weight of the dried coating to the product, is a more accurate guide in determining when the proper coating thickness has been achieved. For instance, it has been observed that a desirable thickness is obtained when the weight of the coating is from about 5 to about 15 grams per 1000 grams of uncoated product.

Another and undoubtedly more important requisite of the coatings employed in the process of this invention is their ability to retard respiration, i.e., to control the rate of oxygen consumption and carbon dioxide evolution resulting from the normal physiological processes of maturation and senescence. Although it might initially appear desirable to attempt to reduce the respiration to zero in order to completely stop the processes of ripening and aging and maintain the postharvest condition for an indefinite period of time, there is a critical minimum respiration rate below which deleterious organoleptic changes occur. For example, if the respiration rate for melons is reduced below 0.8 cubic centimeter of oxygen per kilogram of produce per hour defects in flavor, color and texture will develop.

Thus, as previously indicated, the respiration of the coated produce is at its most desirable rate for optimum enhancement of postharvest storage life when there is a reduction in the oxygen respiration rate at 70° F. of from about 75 to about 85 percent of that of the uncoated comestible (or a reduction of from about 45 to about 55 percent of the respiration rate at 34° F.). Reductions in the respiration rate greater than 85 percent result in undesirable changes in quality, odor, texture and the like.

The coatings of this invention like all films have specific permeabilities to various gas molecules. The permeability to oxygen and carbon dioxide of these coatings is such that, in conjunction with oxygen consumed and carbon dioxide evolved, steady state concentrations of oxygen and carbon dioxide are reached within the produce interstices. The oxygen level is below 21 percent and the carbon dioxide level is at least five percent. It has been established that fruits and vegetables subjected to modified atmospheres containing oxygen in the range of 3–7 percent and 5–10 percent carbon dioxide have reduced respiration rates and therefore longer storage lives. Although there is an optimum oxygen and carbon dioxide level for every fruit and vegetable, in general, the optimum levels with a few exceptions, e.g., cherries, fall in the aforementioned ranges.

Coating fruits and vegetables in accordance with the teachings of this invention reduces the respiration by causing the internal atmosphere within the product to be modified. Carbon dioxide is increased and oxygen lowered. These alterations come about as the result of the product consuming oxygen and evolving carbon dioxide and the coating presenting a permeable barrier to the passage of oxygen and carbon dioxide. It should be emphasized that the exact composition of the modified internal atmosphere is dependent equally upon the coating permeability to oxygen and carbon dioxide molecules and the oxygen consumed and carbon dioxide evolved.

Both desiccation and respiration are directly related to changes in weight of the coated product. Thus, the optimum permeability characteristics of the coatings which are necessary to achieve the desired reduction in desiccation and respiration can be expressed in terms of the weight loss of the coated produce over a given period of time. It has been found that the prolongation of postharvest life is at its maximum when the weight loss of the coated produce is less than 5 percent after 24 days at 34° F.

A third factor necessary to the extension of the postharvest life of fruits and vegetables in accordance with the teachings of this invention is the prevention or delay in microbial growth. It has been observed that the coatings of the present invention prevented mold and other microbial growth for periods as long as 60 days. Although the exact mechanism is not known, studies indicate that the coatings employed do possess some biostatic properties per se.

If desired, the coatings employed in this invention can be used in conjunction with a fungistatic agent, either contained in the coating itself or applied to the produce prior to coating. For example, it was observed that dipping cantaloupes in a solution of a fungistatic agent prior to coating was effective in delaying microbial growth. Illustrative fungistatic agents which can be employed include, among others, sodium hypochlorite, polylysine, sodium o-phenylphenate and the like. When employed as an aqueous dip solution the concentration of the fungistatic agent is preferably from about 0.01 to about 1 percent by weight and more preferably from about 0.1 to about 0.5 percent. Concentrations above and below the aforementioned ranges can also be employed but are less preferred.

Hence, it should be noted that in the instant invention there are several interrelated factors all of which are necessary to the successful prolongation of postharvest life. For example, the coating must be of sufficient thickness to provide a continuous and flexible coating over products which may or may not have a smooth outer surface. At the same time this relatively thick coating must possess the necessary permeability to retard but still permit the desired moisture vapor, oxygen and carbon dioxide transmission to occur.

It has now been found that the optimum and simultaneous control of desiccation, respiration and microbial growth can best be achieved by coating the perishable food produce with an organic latex coating composition which upon drying, forms a nontoxic, water insoluble, flexible, adherent film which has the aforementioned oxygen, carbon dioxide and water vapor transmission properties. Additionally, the coating composition should be easily and quickly applied to form a continuous, nontacky, film over the entire surface of the product.

The organic latexes which are employed in the process of this invention are vinyl acetate polymers. By the term "polymers" as employed throughout the specification and appended claims is meant both homopolymers of vinyl acetate and copolymers of mixtures containing at least 50 weight percent vinyl acetate and at least one other polymerizable monomer. These polymers are uniquely attractive in that they dry rapidly to provide a continuous, tough, flexible, nontacky, transparent coating. Additionally, their moisture, oxygen and carbon dioxide permeabilities are such that the desired oxygen and carbon dioxide concentrations are achieved as well as the optimum desiccation.

Particularly preferred latexes are the vinyl acetate copolymers prepared by the polymerization of a mixture containing at least about 80 weight percent vinyl acetate and the remainder an acrylate monomer. Suitable polymers which can be employed include polyvinyl acetate, vinyl acetate–ethyl acrylate copolymer, vinyl acetate–propyl acrylate copolymer, vinyl acetate–n-butyl acrylate copolymer, vinyl acetate–2-ethylhexyl acrylate copolymer, and the like.

In practice, the preferred polyvinyl acetate latexes are aqueous emulsions characterized by a solids content of at least about 50 weight percent and a Brookfield viscosity as measured by a number 2 spindle at 60 revolutions per minute of from about 100 to about 425 centipoises. The most highly preferred latex is a vinyl acetate–2-ethylhexyl acrylate copolymer having a solids content of from about 53 to 57 weight percent and a Brookfield viscosity of from about 150 to about 400 centipoises.

In practice, the coating of the fruits and vegetables by the process of the instant invention can be effected by a variety of methods. For example, the produce can be sprayed, dipped or rolled in the coating to achieve the desired covering. In most instances the shape of the particular item will influence to a degree the optimum method to be employed. In the case of cantaloupes, coating is conveniently effected by simply immersing the melon in the coating solution. The immersion time is not critical and need only be of such duration to ensure that a complete and continuous coating is obtained.

Drying of the fruits and vegetables coated in accordance with the teachings of this invention can be conveniently effected by a variety of means. For example, the coated produce can be dried by the use of infrared dryers, air dried in a stream of hot air, or other suitable methods. However, it was unexpectedly and surprisingly found that air drying in the presence of cool air, i.e., at room temperature or below, was preferred to drying in the presence of hot air. When hot air was used, e.g., 250° F., the outer surface of the coating quickly sealed over and markedly delayed the drying of the remainder of the coating. The net effect was that the coated produce actually dried faster in the presence of cool air as opposed to hot air. Additionally, it was found that if the surface of the produce was preheated prior to coating, the drying time could be reduced even further. For instance, when cantaloupes were dipped in boiling water for about 30 seconds, then coated and exposed to cool air, drying was completed over five times faster than when the preheating step was omitted and hot air employed. The actual preheating temperature will, of course, vary for different products. However, as a general rule if the outer surface of the produce is preheated to a temperature within the range of from about 130° to about 175° F., the drying time is considerably reduced.

It has been found that drying of the fruits and vegetables which have been coated in accordance with the teachings of this invention, can also be accomplished by the use of electromagnetic waves, e.g., induction or high frequency dryers. The coated material is dried in a relatively short time, by placing it in a strong electrostatic field produced by high frequency voltage. For example, in the drying of coated cantaloupes, the dryer can consist of opposing metallic rods as electrodes which surround the periphery of the melon to be dried. The combined rods represent a capacitor, the plates of which are connected to the terminals of a high frequency electronic generator. During one portion of the electrical cycle, one set of rods is charged positively and the other negatively. As a result, a stress is created in one direction on the molecules of the coating. A half-cycle later, the polarities of the plates are reversed, with a resulting reversal of the atomic or molecular stress in the wet coating which acts as the dielectric of the capacitor. Depending upon the frequency of the electronic generator, the reversal of polarity occurs with great rapidity. This rapidly oscillating electric field generates heat in the wet dielectric coating causing it to dry.

Of particular interest, is the fact that by proper choice of frequency, only the molecules in the coating are caused to oscillate. Hence, little or no heating penetrates the material being coated. Additionally, this type of drying permits heating of the coating at its center even when wet, as rapidly as it heats at its surface. This is in marked contrast to other known drying methods wherein heat must be conducted into the interior of the coating. In the instant invention, this method is extremely beneficial since mere surface drying with its attending stickiness is avoided and the entire coating is dried.

Although the coating of fruits and vegetables by the instant process is effective at room temperature in reducing the postharvest metabolic activity, in its most highly preferred embodiment, the invention encompasses the use of reduced temperatures in conjunction with the coating process. In practice, temperatures as low as about 29° F. are preferred. Temperatures below 29° F. occasionally result in tissue damage to most types of melons and should be avoided.

The process of the present invention is applicable to improving the keeping quality of fruits and vegetables during the normal period of postharvest marketing. However, it is particularly useful for conditioning normally perishable produce which can then be stored for several weeks or months beyond its customary life.

Additionally, the process of the present invention permits a delay in harvesting many fruits and vegetables until they reach the peak of their ripeness. This is not normally possible with many fruits and vegetables which have a short postharvest life and are harvested and allowed to ripen while in transit to the wholesaler and ultimate consumer. These fruits and vegetables are not of as good a quality as those harvested at peak ripeness and hence the instant process provides a means for bringing to the consumer produce of a quality not heretofore readily available.

In general, the process of this invention is particularly applicable to enhancing the storage life of fruits and vegetables which are characterized by a normally nonedible skin or rind, particularly those of the genus Cucumis. For example, muskmelons (species *Cucumis melo*) encompasses some 10 botanical varieties which differ not only in their fruit, but also in their leaves and mode of growth. In the United States, one of the more common types is the botanical variety "inodorous" which includes Honeydews, Casaba, Crenshaw, and Persian. Cantaloupes are small, oval and heavily netted muskmelons and have a normal postharvest life under normal refrigerated storage of about 2 to 4 weeks and at room temperature of less than 1 week.

While the process of the present invention is particularly applicable to enhancing the storage life of muskmelons, it is also useful, but to a less preferred degree, in extending the postharvest life of other fruits and vegetables characterized by a normally nonedible rind. For instance the process can be used to extend the storage life of such produce as oranges, lemons, limes, grapefruit, tangerines, bananas, sweet corn in the husk, and the like.

The following examples are illustrative:

Example 1

Cantaloupes sold under the trade name "Vine-Ripe" Cali-lope brand were purchased on the open market and were estimated to have been harvested approximately 7 to 10 days earlier. The cantaloupes were divided into two portions, one of which was stored at 38° F. as a control. The second portion was coated with a latex consisting of 85 weight percent vinyl acetate and 15 weight percent 2 - ethylhexyl acrylate in copolymerized form, and having a solids content of 54–56 percent. Coating was effected by a single immersion of the cantaloupe in the latex and thereafter allowing the coated produce to dry at room temperature. The coated cantaloupes were then stored at 38° F. with the control portion. After 11 days mold growth was noted on the control cantaloupes. After 32 days the cotrol cantaloupes were completely spoiled and inedible. At the end of an eight week period the coated cantalouples were sliced open and evaluated by a panel of 12 people. Eleven of the panel members rated the coated cantaloupes as completely satisfactory and of good aroma and texture.

Example 2

Cantaloupes sold under the trade name "Niki" Abatti Produce, El Centro, Calif., were purchased on the open market and were estimated to have been harvested approximately 14 days earlier. The cantaloupes were divided into two portions one of which was stored at 38° F. as a a control. The second portion was coated with a latex consisting of 85 weight percent vinyl acetate and 15 weight percent 2 - ethylhexyl acrylate in copolymerized form, and having a solids content of 54–56 percent. Coating was effected by a single immersion of the cantaloupe in the latex and thereafter allowing the coated product to dry at room temperature. The coated cantaloupes were then stored at 38° F. with the control portion. After 21 days the cantaloupes of the control portion exhibited mold growth and at the end of 42 days, were completely spoiled and discarded. In contrast the coated samples exhibited no change up to a period of 11 weeks. At the end of eleven weeks a portion of the coated cantaloupes were evaluated and judged to be at an advanced stage of eating ripeness. The flavor was good and natural. At the end of 15 weeks the remaining melons were on the border of being organoleptically unsatisfactory. At the end of 17 weeks the melons were overripe and unacceptable.

Example 3

In order to demonstrate the effectiveness of the coating process of this invention on the weight loss of produce, over a period of time, recently purchased cantaloupes were divided into two portions, one of which was coated with the vinyl acetate–2-ethylhexyl acrylate latex in the same manner as employed in the previous examples. Both the coated and uncoated cantaloupes were stored at 70° F. and a relative humidity of 40–50 percent. The results of the experiment are set forth in Table I below:

TABLE I.—WEIGHT LOSS OF COATED AND UNCOATED CANTALOUPES

| Percentage weight decrease after one day | | Percentage weight decrease after four days | |
|---|---|---|---|
| Uncoated | Coated | Uncoated | Coated |
| 2.9 | 1.0 | 9.4 | 3.3 |
| 3.2 | 0.9 | 9.2 | 3.3 |
| 2.3 | 0.7 | 6.6 | 3.4 |
| 2.7 | 0.7 | 8.3 | 2.9 |
| 3.3 | 0.9 | 9.5 | 3.7 |
| ----- | 0.8 | ----- | 2.9 |
| ¹ 2.9 | ¹ .83 | ¹ 8.6 | ¹ 3.3 |

¹ Average.

Example 4

In order to further demonstrate the effect of the coating process of this invention on the weight loss and postharvest life of cantaloupes, a comparison was made with known coating compositions. Decco Wax WT-7 [1] sold by the Decco Division of Wallace and Tiernan and specially recommended for coating cantaloupes, was applied as directed to a portion of recently purchased cantaloupes. A second portion of the same cantaloupes was coated with a latex consisting of 85 weight percent vinyl acetate and 15 weight percent 2-ethylhexyl acrylate in copolymerized form and having a solids content of 54–56 percent. Coating was effected by a single immersion of the cantaloupe in the latex and allowing the coated product to dry at room temperature. Both portions were then stored at 32–34° F. At the end of a two week period, the average weight loss for the cantaloupes coated with the commercial product was 4.7 percent in contrast to an average weight loss of only 2.3 percent for the latex coated product. At the end of a three and one half week period the cantaloupes coated with the commercial product had an average weight loss of 8.0 percent in contrast to 4.0 percent for the latex coated product. After 30 days mold growth was observed on the Decco coated cantaloupes.

Example 5

In order to further demonstrate the effect of the coating process of this invention on the postharvest life of cantaloupes, a comparison was made with other known coating compositions. Two coating compositions were prepared according to the disclosure of U.S. Patent 2,213,557. The first composition was a butyl methacrylate-methyl methacrylate-dibutyl phthalate polymer and was prepared following the procedure of Example I of the aforesaid patent. The second coating composition was a butyl methacrylate-damar-dibutyl phthalate polymeric emulsion and was prepared according to the procedure of Example VII of the patent.

Recently purchased cantaloupes were divided into four portions. One portion of the whole cantaloupes was coated with the vinyl acetate-2-ethylhexyl acrylate latex in the same manner as employed in the previous examples. A second portion was coated with the butyl methacrylate-methyl methacrylate-dibutyl phthalate polymer by a single immersion in a solution having a 25.0 percent solids content as recommended in the patent. A third portion of the whole cantaloupes was coated with the methyl methacrylate-dibutyl phthalate polymer in a similar manner. The coated cantaloupes were all allowed to dry at room temperature. The fourth portion served as a control. All of the coated cantaloupes were then stored at room temperature, i.e., 70° F. After approximately two days at room temperature, the weight loss was determined and respiration data obtained by a measurement of the oxygen consumed. The results obtained are set forth in Tables II and III below.

TABLE II.—WEIGHT LOSS OF COATED AND UNCOATED CANTALOUPES

| Coating | Control | A [1] | B [2] | C [3] |
|---|---|---|---|---|
| Percentage weight decrease after two days | 4.6 | 3.4 | 2.8 | 1.8 |

For footnotes (1), (2), and (3) see end of Table III.

TABLE III.—RESPIRATION OF COATED AND UNCOATED CANTALOUPES AT ROOM TEMPERATURE

| Coating | Control | A [1] | B [2] | C [3] |
|---|---|---|---|---|
| Average respiration rate [4] | 3.57 | | | |
| Percentage reduction in respiration compound to control | | 6.41 | 20.4 | 85.6 |

[1] Butyl methacrylate-methyl methacrylate-dibutyl phthalate polymer.
[2] Butyl methacrylate-damar-dibutyl phthalate polymer.
[3] Vinyl acetate-2-ethylhexyl acrylate latex.
[4] In cubic centimeters of oxygen consumed per kilogram of cantaloupe per hour.

---

[1] Principal functioning agents are 17 percent hydrogenated wax, natural wax and alkali soaps of fatty acids and 83 percent constituents ineffective as spray adjuvant.

Example 6

In order to determine the effect of the coating process of this invention on the respiration of food products at room temperature, recently purchased cantaloupes were divided into three portions. One portion was coated with the vinyl acetate-2-ethylhexyl acrylate latex in the same manner as employed in the previous examples. A second portion was coated with a vinyl acetate polymer by a single immersion in a solution having a 54–56 percent solids content. The remaining portion served as the control. All three portions were stored at 70° F. and at a relative humidity of 40–50 percent. The respiration data obtained by a measurement of the oxygen evolved is set forth in Table IV below:

TABLE IV.—RESPIRATION OF COATED AND UNCOATED CANTALOUPES AT ROOM TEMPERATURE

| Coating | Control | Latex [1] | Latex [2] |
|---|---|---|---|
| Average respiration rate [3] | 24.1 | 4.5 | 6.0 |
| Percentage reduction in respiration rate compared to control | | 81.2 | 75.1 |

For footnotes (1), (2), and (3) see end of Table V.

Example 7

In order to determine the effect of the coating process of this invention on the respiration of food products at refrigerated conditions, recently purchased cantaloupes were divided into three portions. One portion was coated with the vinyl acetate-2-ethylhexyl acrylate latex in the same manner as employed in the previous examples. A second portion was coated with a vinyl acetate polymer by a single immersion in a solution having a 54–56 percent solids content. The remaining portion served as the control. All three portions were stored at 34° F. and at a relative humidity of 60–70 percent. The respiration data obtained by a measurement of the oxygen evolved is set forth in Table V below:

TABLE V.—RESPIRATION OF COATED AND UNCOATED CANTALOUPES AT REDUCED TEMPERATURE

| Coating | Control | Latex [1] | Latex [2] |
|---|---|---|---|
| Average respiration rate [3] | 1.8 | 0.9 | 1.0 |
| Percentage reduction in respiration rate compared to 34° F. control | | 50.0 | 44.4 |

[1] Vinyl acetate-2-ethylhexyl acrylate copolymer.
[2] Vinyl acetate polymer.
[3] In cubic centimeters of oxygen consumed per kilogram of cantaloupe per hour.

Tables IV and V give respiration rates of untreated and coated melons at room and refrigerated temperatures. It is especially important to note the respiration rate at 34° F. of the latex coated samples. The respiration rate of these coated samples has been reduced 96.3 and 95.9 percent of the respiration rate of uncoated melons at room temperature and 50 and 44.4 percent of those at 34° F. Knowing that reduction in respiration rate is equivalent to increase in storage life, one can appreciate the extension in postharvest life of a latex coated cantaloupe stored at 34° F. It has been found that storage lives were inversely proportional to respiration rates. That is, at 34° F., the coated samples had the longest postharvest life and the uncoated samples had the shortest. It should also be pointed out that the samples with the higher respiration rates of Tables IV and V had the shorter postharvest life as evidenced by the onset of spoilage due to internal breakdown.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A process for lengthening the postharvest life of perishable comestibles selected from the class consisting of fruits and vegetables which are characterized by a normally nonedible rind, which process comprises forming a coating over the entire surface of said comestible of a transparent, flexible polymeric vinyl acetate coating, comprised of, in polymerized form, at least about 50 weight percent vinyl acetate, said coating being characterized by a thickness such that: (1) the weight of the coating is from about 0.5 to about 1.5 weight percent of the uncoated comestible; (2) the weight loss of the coated comestible after 24 days at 34° F. is less than about 5 percent; and (3) the oxygen respiration rate at 70° F. is reduced from about 75 to about 85 percent of the oxygen respiration rate of the uncoated comestible, and thereafter drying said comestible.

2. A process for lengthening the postharvest life of perishable comestibles selected from the class consisting of fruits and vegetables which are characterized by a normally non-edible rind, which process comprises forming a coating over the entire surface of said comestibles of a vinyl acetate-acrylate latex comprised of, in polymerized form, at least about 50 weight percent vinyl acetate, said coating being characterized by a thickness such that: (1) the weight of the coating is from about 0.5 to about 1.5 weight percent of the uncoated comestible; (2) the weight loss of the coated comestible after 24 days at 34° F. is less than about 5 percent; and (3) the oxygen respiration rate at 70° F. is reduced from about 75 to about 85 percent of the oxygen respiration rate of the uncoated comestible, and thereafter drying said comestible.

3. A process for lengthening the postharvest life of perishable comestibles selected from the class consisting of fruits and vegetables which are characterized by a normally non-edible rind, which process comprises forming a coating over the entire surface of said comestibles of a vinyl acetate-ethylhexyl acrylate latex comprised of, in polymerized form, at least about 50 weight percent vinyl acetate, said coating being characterized by a thickness such that: (1) the weight of the coating is from about 0.5 to about 1.5 weight percent of the uncoated comestible; (2) the weight loss of the coated comestible after 24 days at 34° F. is less than about 5 percent; and (3) the oxygen respiration rate at 70° F. is reduced from about 75 to about 85 percent of the oxygen respiration rate of the uncoated comestible, and thereafter drying said comestible.

4. A process for lengthening the postharvest life of muskmelons which process comprises forming a coating over the entire surface of said muskmelons of a vinyl acetate-ethylhexyl acrylate latex comprised of, in polymerized form, at least about 50 weight percent vinyl acetate, said coating being characterized by a thickness such that: (1) the weight of the coating is from about 0.5 to about 1.5 weight percent of the uncoated comestible; (2) the weight loss of the coated comestible after 24 days at 34° F. is less than about 5 percent; and (3) the oxygen respiration rate at 70° F. is reduced from about 75 to about 85 percent of the oxygen respiration rate of the uncoated comestible, and thereafter drying said comestible.

5. A process for lengthening the postharvest life of cantaloupes which process comprises coating the entire surface of said cantaloupes with a vinyl acetate-ethylhexyl acrylate latex having a solids content of at least about 50 weight percent and comprised of, in polymerized form, at least about 50 weight percent vinyl acetate, said coating being characterized upon drying by a thickness such that: (1) the weight of the coating is from about 0.5 to about 1.5 weight percent of the uncoated comestible; (2) the weight loss of the coated comestible after 24 days at 34° F. is less than about 5 percent; and (3) the oxygen respiration rate at 70° F. is reduced from about 75 to about 85 percent of the oxygen respiration rate of the uncoated comestible, and thereafter subjecting said coated cantaloupes to drying conditions.

6. The process of claim 5 wherein said coated cantaloupes are dried at a temperature of less than about 70° F.

7. The process of claim 6 wherein the surface of the cantaloupe prior to coating is preheated by exposure of said cantaloupe to a temperature of from about 130° to about 175° F.

References Cited

UNITED STATES PATENTS 2,872,325   2/1959   Scott et al. _____ 99—168 X
2,213,557   9/1940   Tisdale et al. _____ 99—168

RAYMOND N. JONES, *Primary Examiner.*